United States Patent [19]
Charm

[11] 4,238,521
[45] Dec. 9, 1980

[54] PROCESS FOR THE REMOVAL OF ANTIBIOTICS FROM MILK

[75] Inventor: Stanley E. Charm, Newton, Mass.

[73] Assignee: Penicillin Assays, Inc., Boston, Mass.

[21] Appl. No.: 76,600

[22] Filed: Sep. 18, 1979

[51] Int. Cl.$^3$ .............................................. A23C 9/15
[52] U.S. Cl. .................................. 426/580; 210/673; 210/694
[58] Field of Search ....................... 210/32, 36, 39, 40; 426/422, 491, 580, 587

[56] References Cited
U.S. PATENT DOCUMENTS

| 274,469 | 3/1883 | DeCastro | 426/422 |
| 1,772,349 | 8/1930 | Hill | 426/422 |

OTHER PUBLICATIONS

Chemical Abstract No. 48413e, vol. 71, (1969).

*Primary Examiner*—Ivars C. Cintins
*Attorney, Agent, or Firm*—Richard P. Crowley

[57] ABSTRACT

A method of removal of penicillin from penicillin-contaminated milk, which method comprises contacting the contaminated milk with activated charcoal and recovering a penicillin-free milk product.

22 Claims, 1 Drawing Figure

PROCESS FOR THE REMOVAL OF ANTIBIOTICS FROM MILK

BACKGROUND OF THE INVENTION

Various antibiotics, particularly penicillin, tetracycline, streptomycin and other antimicrobial antibiotics, are employed typically with milk-producing animals, and more particularly in the treatment of mastitis in milk-producing cows. The use of such antibiotics often leads to the product of milk which has been contaminated with such antibiotics, and particularly with penicillin in the more typical situation. Milk contaminated by such antibiotics cannot be sold by law, if the penicillin or other antibiotics are present in a detectable amount. At present, highly contaminated milk would present a fluid of reconditioned, dried-milk product having a detectable level of 0.1 international units per ml of penicillin G in the milk; for example, 0.1 to 0.2 international units (where 0.05 international units are equal to 30 nanograms of the penicillin G per ml). A present standard test for the detection of penicillin in milk is a microbial-inhibition test which does not exceed a sensitivity of approximately 0.01 international units per ml. Thus milk contaminated with penicillin is hazardous and cannot by law be employed in fluid form.

Contaminated fluid milk, when found, is often discarded, or it may be subject to a multiple drying process; that is, dried and redried several times, to recondition the milk and to form a reconditioned dried product. The reconditioned dried product then may be mixed with water to form a liquid, reconditioned-milk composition which also must not have any detectable penicillin or other antibiotics therein. Only relatively low amounts of penicillin in contaminated milk can be accommodated by employing the reconditioning process. Contaminated dried milk may be sold as an animal-feed product or supplement, but demands a very low price, while a liquid, reconditioned-milk composition; that is, a milk composition using the dried, reconditioned-milk powder, without detectable penicillin, may be sold at a much higher price and may be employed for manufacturing various edible food products which contain other ingredients, such as for use in candy, bakery products and the like. Thus highly contaminated fluid milk must be discarded, while fluid milk containing very low levels of penicillin contamination may be reconditioned using a multiple-drying process; however, such a process is both costly and time-consuming and often leads to uncertain results as to whether the dried milk can be prepared without detectable penicillin therein.

Therefore, it would be most desirable to provide for a simple, effective and inexpensive process for the treatment of contaminated milk to remove penicillin and/or other contaminating antibiotics therefrom.

SUMMARY OF THE INVENTION

My invention relates to a process for the removal of antibiotics, particularly penicillin, from milk and milk products and to the antibiotic-free products produced thereby. In particular, my invention concerns removal of penicillin, such as penicillin G, from a liquid, reconstituted-milk composition, without significantly altering the physical characteristics of the milk composition, thereby providing for a simple, effective and inexpensive method to permit the recovered milk product to be employed in edible food products.

I have discovered quite unexpectedly that activated charcoal may be employed to remove penicillin from milk, without altering the physical properties or characteristics of the contaminated milk. My process is particularly useful in the removal of penicillin and/or other antibiotics, such as tetracycline, streptomycin or combinations thereof, from milk compositions and, more particularly, from a liquid, reconstituted-milk composition, where the level of concentration may vary as desired.

In my process for the removal of penicillin from milk compositions, particulate activated charcoal, typically from which fine particles have been removed, is placed in contact, such as by admixing, with the liquid milk composition, and contact is maintained for a sufficient period of time to enable the activated charcoal to remove the penicillin or other antibiotic or antibiotic residues from the milk composition, to provide for a milk composition having no detectable level of penicillin and/or other antibiotics. Optionally and preferably thereafter, the recovered and treated milk composition may be filtered and subsequently centrifuged to remove any activated-charcoal, fine, particulate material which may become dislodged during the treatment process. The milk product recovered from my process is free of detectable penicillin and then may be employed in the manufacture and preparation of various food products.

My process is particularly adapted for the removal of penicillin from liquid, reconstituted-milk compositions which normally would be sold as animal feed, but which, by my process, may be employed in the manufacture and preparation of various food products by upgrading both the quality of the product and the price obtainable for the product. Significantly, my process provides for the removal of penicillin at any level of antibiotic contamination by a simple, inexpensive and certain process, without altering the physical characteristics of the milk product being treated. My process particularly is adapted for liquid, reconstituted-milk compositions, wherein the penicillin contamination ranges from about 0.01 to 0.2 international units, and preferably less than 0.05 international units.

It has been reported that activated charcoal has been used in the past to remove, by adsorption or absorption, many materials from various fluids and particularly has been used in the manufacture of penicillin to remove contaminants from the penicillin broth. However, it never has been realized or recognized before that penicillin and other antibiotics may be removed from contaminated-milk compositions, without altering the properties of the milk, in an easy, simple and effective manner through the use of activated charcoal, and it has not been recognized that such charcoal would absorb the penicillin from the milk composition in very small amounts which would constitute contamination of the milk composition. My process may be carried out either in a batch or a continuous-process technique by which activated charcoal, particularly a hard activated charcoal, such as that derived from coconut or coal-based charcoal which is FDA-approved, is used. The activated charcoal may be employed in a variety of forms, but typically is employed as a particulate material, such as having a 12×40 grade-size activated charcoal.

The contact of the contaminated-milk composition with the activated charcoal may take place in a vessel or column or employing various recycling techniques. The method of contact does not appear to be critical, and the time of contact should be sufficient to permit the removal of the penicillin or the antibiotic to a nondetectable level, which time may vary from a few minutes to a few hours, depending upon the charcoal, the level of contamination and the milk composition being treated and other process parameters. When it is not desired to reconstitute milk to full strength; for example, when it is to be redried after processing, it is preferred to mix the charcoal directly with the milk concentrate, since the high viscosity makes it difficult to circulate.

Typically, the activated charcoal should be treated prior to the contacting step, such as by washing the charcoal and removing fines therefrom which may contaminate the milk composition to be treated or passed through the filters. After such treatment, the milk composition is placed in contact with the activated charcoal, and, thereafter, when the antibiotic has been reduced to an antibiotic-free and nondetectable antibiotic level in the milk, the milk composition so treated is filtered or centrifuged, or both, or otherwise treated to remove any activated-charcoal particulate or other material of the milk composition which might have been occasioned by the processing. The milk product recovered, after the treating, contacting and filtering and being free of penicillin, may be employed as a food product.

In the event that it is found that the use of contaminated fluid milk in my process removes any of the vitamins or other desirable materials of fluid milk, then such materials may be incorporated as additives back to the natural levels in the fluid milk or to higher levels, as desired or required, after the filtration of the milk product. Alternatively, by prior treating of the charcoal with vitamins and other materials which might be adsorbed from fluid milk, the charcoal adsorption sites for these materials may be saturated; thus preventing the further adsorption of these materials from milk. Also, the prior treatment of the charcoal with uncontaminated milk will saturate adsorption sites in the charcoal for these materials and will prevent the later adsorption of these materials from the milk being processed to remove antibiotic contaminants. Where the milk composition to be treated comprises a liquid, reconstituted-milk composition, the activated charcoal produces no significant changes in the physical properties of the milk after treatment, and the milk may be employed directly after filtration in the usual manner as a food additive, either as a liquid or as a dried product.

The temperature of contact between the activated charcoal and fluid milk may vary; for example, up to 45° C.; however, it has been found that temperatures below about 15° C. are more desirable, and a particularly preferred absorption temperature is about 4° C. for fluid milk, which also inhibits microbial growth. However, in the case of concentrated-milk compositions, higher temperatures of up to 45° C.; for example, 35° C., may be used to aid in the recycling process or circulation of the milk, even though the penicillin absorption will be reduced. The milk-concentration range of the treated milk composition may vary and range from one part milk to three parts of water to whole fluid milk, which is about one part milk to nine parts of water; that is, 1:3 to 1:9.

My process will be described in its preferred embodiment; however, it is recognized that various changes and modifications may be made to my process by others skilled in the art, all without departing from the spirit and scope of my invention.

BRIEF DESCRIPTION OF THE DRAWING

The drawing is a schematic representative view of an apparatus and process for the removal of penicillin from a liquid, reconstituted-milk composition.

DESCRIPTION OF THE EMBODIMENTS

Figure 1:
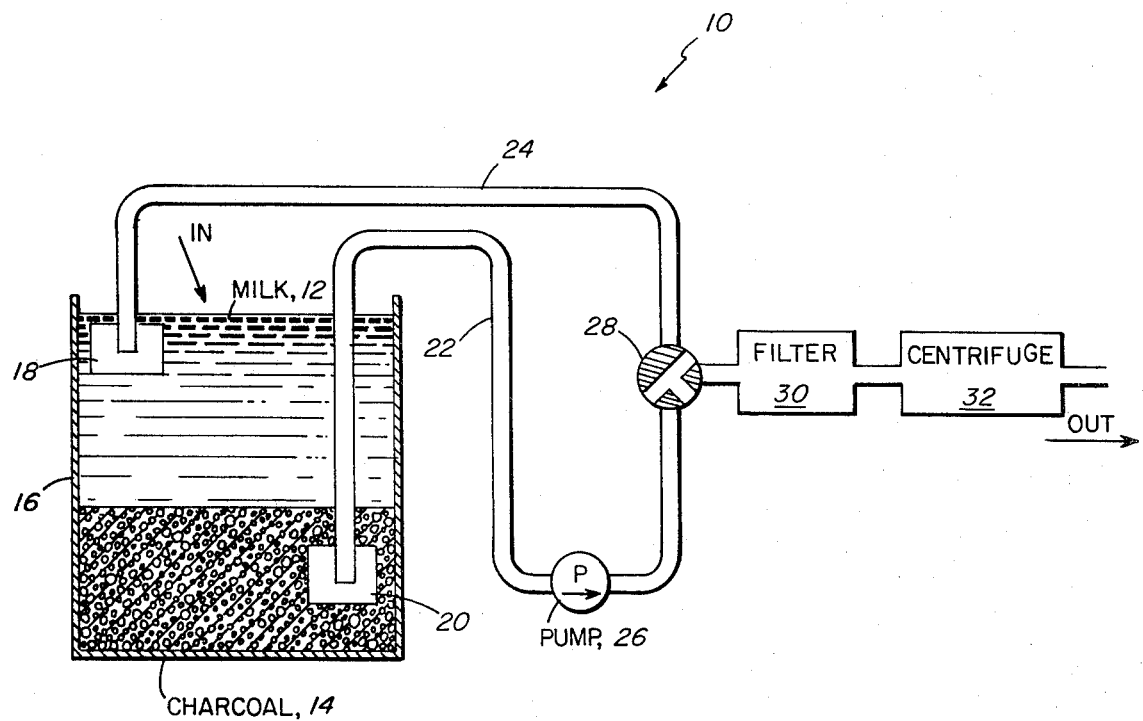

My process will be described in connection with the schematic apparatus as shown in the drawing which constitutes a batch-recycling method from a charcoal bed, to remove penicillin from a liquid, reconstituted-milk composition. The apparatus 10 comprises a vessel 16 which contains a contaminated, liquid, reconstituted-milk composition 12 and a bed of activated charcoal 14 in the bottom of the vessel, with an outlet line 22 having a filter cloth 20 at the lower open end thereof immersed within the charcoal bed 14, and an inlet line 24 having a filter cloth 18 at the other end thereof immersed just below the surface of the milk 12 in the vessel 16. The milk is recycled using a recycling pump 26, wherein milk is recycled. A three-way valve 28 and outlet line 22 are employed, whereby the milk, after recycling for a period of time sufficient to remove any detectable penicillin or other antibiotics, is directed to a filter 30 for the removal of any particulate matter, such as charcoal, which might have been broken off in the process from the charcoal bed 14. Thereafter, the milk is sent to a centrifuge 32, and the penicillin-free milk product thereafter is recovered.

The activated charcoal employed is typically washed and filtered with hot water to remove fines and to clean the charcoal, with a food-approved grade of charcoal being employed. The particulate activated charcoal 14 is then placed in the vessel 16, and an amount of the milk composition, equivalent to approximately one-to-four-charcoal-bed volume, is cycled by use of the recycling pump 26 through the charcoal bed 14 and, thereafter, is discarded. A weight ratio of approximately five parts of the milk composition to one part of the activated charcoal is then employed in the vessel, and the milk composition is recycled through the charcoal bed 14 for approximately 10 minutes at a rate equivalent to at least 0.7 to 2.0 bed weights of charcoal per minute, which has been found to be a sufficient period of time to remove the penicillin from the contaminated-milk composition, as employed in the example. At the end of the recycling time, the processed milk is removed from the tank through three-way valve 28 and is sent to filter 30 and centrifuge 32, and another batch of contaminated-milk composition is then added into the vessel 16. After processing, cold water typically is used to rinse the remaining milk composition from the charcoal bed 14, and then a hot-water wash is applied to clean the charcoal bed 14 and to regenerate the activated charcoal. Boiling the charcoal in water for 15 minutes is a highly effective way to regenerate and clean the charcoal.

An experiment, using the apparatus of the drawing, was carried out. 10 grams of a food-grade charcoal (CPG 12×40—Calgon Co., N.J.) were washed several times, and the fines were removed in a filter. The charcoal was then transferred to the vessel, so that the outlet tube was at the bottom of the charcoal bed. The bed was washed with 30 ml of milk. Then 50 ml of contaminated reconstituted milk, containing 0.050 I. $\mu$/ml of penicillin G, were placed in the vessel and were recycled. Samples of milk were removed periodically and were tested for penicillin. The results are shown in Table I.

TABLE I

Removal of Penicillin from Milk

| | |
|---|---|
| Charcoal-Bed Wt. | 10 grams |
| Milk Volume in Bed | 10 ml |
| Recirculation Rate | 21 ml/min |
| Milk Volume in System | 50 ml |
| Temperature | 15° C. |

| Time Elapsed (min) | Concentration of Penicillin in Milk I. $\mu$/ml |
|---|---|
| 0 | 0.05 |
| 5 | 0.007 |
| 10 | 0.0025 |
| 20 | 0.00 |

The present standard tests for penicillin only can detect to 0.01 I. $\mu$/ml of penicillin. The penicillin assays were carried out using the Charm Test for penicillin detection (see *Cultured Dairy Products Journal*, pages 24–26, May 1979). Up to five batches of milk were similarly tested, with no apparent decrease in capacity.

Washing with hot water or boiling the charcoal in water permits additional batches of milk to be treated with the same charcoal, as shown in the data of Table II.

TABLE II

Removal of Penicillin Using 10-minute Recycle Time from Successive Batches of Milk

| Batch No. | Concentration of Penicillin I. $\mu$/ml |
|---|---|
| Not Processed | 0.08 |
| 5 | 0.0025 |
| 8 | 0.005 |
| 9 | 0.20 |
| 12 | 0.020 |
| Charcoal partially regenerated with hot water | |
| 13 | 0.01 |
| Charcoal completely regenerated by boiling in hot water | |
| 14 | 0.0025 |

Having thus described my invention, what I claim is:

1. A process for the removal of penicillin from a penicillin-contaminated milk composition, which process comprises:
   (a) contacting a penicillin-contaminated milk composition with activated charcoal for a sufficient period of time to remove the penicillin from the contaminated milk composition to a nondetectable concentration of penicillin, without altering the physical characteristics of the milk composition; and
   (b) recovering the penicillin-free milk composition, thereby providing a milk composition free of penicillin contamination and suitable for use in the preparation of edible food products.

2. The process of claim 1 which comprises contacting the contaminated milk composition with activated charcoal for a period of time ranging from about 2 minutes to 2 hours.

3. The process of claim 1 wherein the milk composition is contaminated with penicillin in a range of from about 0.001 to 0.5 international units per ml.

4. The process of claim 1 which includes recycling the contaminated, liquid, milk composition through a bed composed of activated charcoal.

5. The process of claim 1 which includes the step of removing activated-charcoal particulate matter from the milk composition, from which the penicillin has been removed, prior to recovering the penicillin-free milk composition.

6. The process of claim 5 which includes filtering and subsequently centrifuging the milk composition to remove particulate material.

7. The process of claim 1 which includes rinsing the activated charcoal prior to contacting and removing fines from the activated charcoal.

8. The process of claim 1 which comprises contacting from about two to ten parts of milk composition by weight to one part of charcoal.

9. The process of claim 1 which includes preparing a bed of activated charcoal composed of particulate matter and passing the penicillin-contaminated milk composition through the bed of charcoal.

10. The process of claim 1 which includes, prior to the contacting step, passing noncontaminated milk through the charcoal to saturate sites on the charcoal with material from the noncontaminated milk, thereby preventing further adsorption of such material from the penicillin-contaminated milk during the contacting step.

11. The process of claim 1 which includes regenerating the charcoal for the purpose of removing penicillin by subjecting the charcoal to boiling or hot water for a period of time to regenerate the activity of the charcoal.

12. The process of claim 1 wherein the milk composition is a reconstituted-milk composition.

13. The process of claim 1 wherein the contacting is carried out at a temperature of less than 45° C.

14. The process of claim 1 wherein the contacting is carried out at a temperature of about 4° C. and wherein the milk composition is fluid whole milk.

15. The process of claim 1 which includes treating the activated charcoal prior to the contacting step with material which is adsorbed from the milk by the activated charcoal to saturate sites on the charcoal with such material, thereby preventing further adsorption of said material from the penicillin-contaminated milk during the contacting step.

16. The process of claim 15, wherein the material is a vitamin.

17. The process of claim 1 wherein the penicillin-contaminated milk composition is contaminated with penicillin G.

18. The process of claim 1 which includes contacting the penicillin-contaminated milk composition by admixing particulate activated charcoal into the said milk composition, and, thereafter, removing the admixed, particulate, penicillin-adsorbed, activated charcoal from the milk composition.

19. The process of claim 1 wherein the penicillin-contaminated milk composition is passed through a bed of activated charcoal and, after removing penicillin from the contaminated-milk composition, the bed of activated charcoal is rinsed with cold water to remove any remaining milk composition from the bed, and, thereafter, the bed of activated charcoal is washed with hot water to clean and reactivate the activated charcoal for reuse.

20. The process of claim 1 wherein the activated charcoal is a food-grade activated charcoal of 12×40 grade size.

21. A process for the removal of penicillin and antibiotic residues from a contaminated, reconstituted-milk composition, which process comprises:
(a) contacting the penicillin-contaminated milk composition with a bed of particulated, food-grade, activated charcoal;
(b) recycling the milk composition through the bed of charcoal for a period of time of from 2 minutes to 2 hours, to remove the penicillin from the contaminated-milk composition and to provide a penicillin-free milk composition;
(c) periodically regenerating the activated charcoal in the bed by contacting the bed of activated charcoal with boiling or hot water to regenerate the charcoal;
(d) removing any particulate activated charcoal derived from the contacting step from the penicillin-free milk composition; and
(e) recovering a penicillin-free milk composition suitable for use as a food-additive material.

22. The process of claim 21 which includes contacting the penicillin-contaminated milk at a temperature of from about 4° C. to 45° C.

* * * * *